UNITED STATES PATENT OFFICE 2,185,654

PROCESS FOR THE PRODUCTION OF SULPHONIUM SULPHONATES

Adrianus Johannes van Peski, and Johan Marius Hoeffelman, Amsterdam, Netherlands, assignors to Shell Development Company, San Francisco, Calif., a corporation of Delaware No Drawing. Application July 11, 1938, Serial No. 218,632. In the Netherlands July 21, 1937

10 Claims. (Cl. 260—607)

The present invention relates to a process for the production of sulphonium sulphonates. These compounds may be represented by the general formula

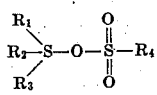

wherein $R_1$, $R_2$, $R_3$ and $R_4$ represent the same or different organic radicals.

Compounds of the above general formula may be produced by causing an ester of a sulphonic acid to react with a thio-ether, the general reaction being

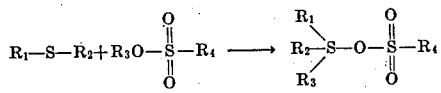

In order to produce sulphonium sulphonates by this method, it is first necessary to produce the sulphonic acid ester. As is well known, sulphonic acid esters are extremely difficult to produce by direct esterification of an alcoholic compound with a sulphonic acid and are, therefore, usually prepared by first reacting the sulphonic acid with $PCl_5$ to form the sulphonic acid chloride and then esterifying.

An object of the present invention is to provide a method whereby sulphonium sulphonates may be produced more economically from less expensive raw materials.

We have found that although esterification of alcoholic compounds by sulphonic acids does not take place to any appreciable extent under the usual esterification conditions, the reaction between sulphonic acids and certain alcohols takes place readily to give good yields of sulphonium sulphonates when induced by the simultaneous addition of certain thio-ethers. The alcohols which were found readily to undergo esterification with sulphonic acids with simultaneous addition of a thio-ether to form sulphonium sulphonates directly according to the invention are the aliphatic monohydric primary alcohols with up to six carbon atoms in the molecule, which alcohols may be substituted or not. The thio-ethers to be used may be represented by the formula $R_1$—S—$R_2$, wherein $R_1$ is an aliphatic low molecular radical (that is a radical containing less than five carbon atoms) and $R_2$ is the same or a different aliphatic low molecular radical or an aliphatic high molecular radical (that is one containing more than five carbon atoms), which preferably has a straight or only slightly branched carbon chain. The reaction between such an alcohol, which may be represented by the formular $R_3OH$, wherein $R_3$ represents an aliphatic primary radical containing not more than six carbon atoms which may be substituted, a sulphonic acid $R_4SO_3H$, wherein $R_4$ represents an organic radical, and such a thio-ether (disregarding the mechanism, which is not definitely known) is as follows:

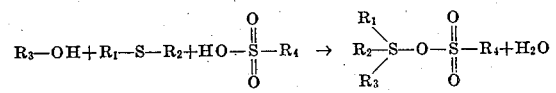

According to the process of the present invention, sulphonium sulphonates may be prepared directly, as can be seen from the above, from the alcoholic compound, sulphonic acid and thio-ether. Since this method eliminates the necessity of first preparing the sulphonic acid ester, sulphonium sulphonates, products containing them and products derived from them may be prepared through the present method at a considerably lower cost.

The reaction may be carried out at temperatures ranging from about 50° C. up to the decomposition temperature of the products, temperatures ranging from about 100° C. to about 200° C. being most economical and convenient. The reaction may be carried out in a closed vessel, such as an autoclave, under the autogenic pressure, i. e., the pressure automatically generated by heating the reaction mixture in a sealed vessel. Higher pressures may also be used, if desired. In most cases better results are obtained, however, when working under atmospheric pressure, provided that intensive stirring is applied. The process may be operated batchwise, intermittently or continuously.

It is sometimes advantageous to carry out the reaction in the presence of an inert solvent or dispersing medium. Any light petroleum fraction, such as gasoline, aromatic hydrocarbon, such as xylene, chlorinated solvent, such as carbon tetrachloride, or the like may be used. The presence of a solvent, although not essential, tends to make the reaction proceed smoother and also, upon being removed by distillation after the reaction has been effected, serves as a convenient means for removing the water of esterification.

In general the reactants are charged in about equimolecular amounts or an excess of the alcoholic compound is used. In such cases where a high boiling alcoholic compound and a low boiling thio-ether are being reacted with a sulphonic acid, the thio-ether is preferably used in excess and the unreacted excess recovered by distillation after completion of the reaction. In such cases where both the alcoholic compound and the thio-ether are too high boiling to be conveniently recovered by distillation, an excess of the sulphonic acid may be used.

Sulphonic acids which may be used in the present process are, for example, p-toluene sulphonic acid, benzene sulphonic acid, beta-naphthalene sulphonic acid, butyl naphthalene sulphonic acid, hydrogenated naphthalene sulphonic acid, benzene meta di-sulphonic acid, o-sulphonbenzoic acid, sulphanilic acid, cetyl benzene sulphonic acid, dodecyl sulphonic acid, ethyl sulphonic acid, chlorethyl sulphonic acid, mineral oil sulphonic acids, etc.

Examples of suitable alcoholic compounds which may be used in the present process are: ethanol, propanol, isobultanol, beta chlor ethanol and the like.

Examples of suitable thio-ethers to be used in the present process are: methyl cetyl sulphide, ethyl cetyl sulphide, beta hydroxy ethyl cetyl sulphide, methyl dodecyl sulphide, beta chlorethyl dodecyl sulphide, ethyl dodecyl sulphide, di-ethyl sulphide, etc.

The properties of the products of the present invention vary depending upon the reactants used, i. e. upon the characters of the various R groups in the above general formula. In general, sulphonium sulphonates of the above general formula, in which the sum of the carbon atoms in the groups $R_1$, $R_2$ and $R_3$ is about 12 or over, are capillary-active and may possess excellent wetting, foaming, emulsifying and to some extent detergent properties, depending upon the character of the R groups. These products are, in general, white crystalline solids, soluble in water to give clear solutions and soluble to varying extents in lipophillic solvents. Their aqueous solutions are stable at elevated temperatures in neutral as well as weakly alkaline media. Many of them in concentrations as low as from 0.1 to 1% in water form viscous liquids.

These capillary-active sulphonium sulphonates may be used by themselves or in combination with other capillary-active agents for any purposes for which capillary-active agents have hitherto been used. They are especially suited for the manufacture of lubricating oils and greases, cosmetics, pharmaceutical products, paints and the like.

Aside from the capillary-active sulphonium sulphonates, the products of the present invention have other uses. In general, the present sulphonium sulphonates possess a certain toxicity and repellancy to various lower forms of life, their toxic nature being largely dependent upon the character of the various R groups. Through proper choices of the various R radicals and their substituted groups, products with variable toxic properties may be produced. These products are well suited for use in antiseptics, disinfectants, insecticidal sprays, dairy detergents, moth-proofing agents, etc. They are also suited for use in preparations containing glue, starch, etc., such as adhesives, where they may function both as penetrating or emulsifying agents and as preservatives.

The products of the present process, since they are made from relatively inexpensive raw materials, can be produced at a relatively low cost. These products, when prepared according to the present process, may, therefore, enjoy a broad field of utility and may be used commercially for numerous purposes in competition with other inexpensive products. Examples of such uses include the use in insecticidal sprays, insect repellants, cements, fire-extinguisher preparations, in the soaking, deliming, bating and dyeing of leather, in the treating of rags and pulp in paper manufacture, in the flotation of ores, for preventing the dusting of coal, in the preservation of wood, in the production of asphalt emulsions, etc.

The following examples, which are not to be construed as limitative, illustrate the process of the invention as applied to the preparation of a few of the present products. Other products, prepared from any of the alcohols, thio-ethers and sulphonic acid mentioned above, may be prepared in an analogous maner.

*Example I*

Equimolecular quantities of methyl cetyl sulphide and anhydrous paratoluene sulphonic acid are heated in an autoclave for about two hours at 150° C. in the presence of an excess of methanol. The reaction product consists of two layers. The lower layer contains the desired reaction product, which in this case is dimethyl cetyl sulphonium paratoluene sulphonate. The pure sulphonium compound may be isolated by precipitating it from the lower layer by diluting with diethyl ether and filtering. The yield is 60% of the theoretical, or over. The dimethyl cetyl sulphonium paratoluene sulphonate is a white crystalline compound soluble in water to give a clear solution. It is a capillary-active compound whose outstanding property is its ability to produce a large amount of very stable foam.

In the above example the preparation of the pure reaction product is described. For many uses the lower layer of the reaction product may be used without isolating the pure compound.

*Example II*

Equimolecular quantities of ethyl-n-dodecyl sulphide and anhydrous beta naphthalene sulphonic acid are heated in an autoclave for about three hours at 140° C. in the presence of an excess of ethanol. The reaction product, which consists essentially of di-ethyl-n-dodecyl sulphonium beta naphthalene sulphonate, is found in the lower layer and may be recovered pure, if desired.

*Example III*

A quantity of a mixture of oil-soluble sulphonic acids obtained as a by-product in the refining of mineral oil and having an equivalent weight of 409 is mixed with an equimolecular quantity of di-ethyl sulphide and an excess of methanol. The mixture is heated in an autoclave for a few hours at 140° C. The product obtained in this case is soluble in gasoline as well as in water.

*Example IV*

Equimolecular quantities of methyl cetyl sulphide, paratoluene sulphonic acid and beta chlorethanol are heated for three hours at 140° C. in an autoclave. The reaction product consists essentially of beta chlorethyl methyl cetyl sulphonium paratoluene sulphonate.

We claim as our invention:

1. A process for the production of sulphonium sulphonates, which comprises reacting together an aromatic sulphonic acid, a di-alkyl thio-ether having a low molecular hydrocarbon radical directly attached to the sulphur atom and an aliphatic monohydric primary alcohol containing up to six carbon atoms in the molecule, at a temperature of from about 100° to 200° C. in the presence of an inert solvent.

2. A process for the production of sulphonium sulphonates, which comprises reacting together an aromatic sulphonic acid, an aliphatic thio-ether having a low molecular hydrocarbon radical directly attached to the sulphur atom and a chlorinated aliphatic monohydric primary alcohol containing up to six carbon atoms in the molecule, at a temperature of from about 100° to 200° C., in the presence of an inert solvent.

3. A process for the production of sulphonium sulphonates, which comprises reacting together an aromatic sulphonic acid, an aliphatic thio-ether having an aliphatic group containing less than five carbon atoms directly attached to the sulphur atom and an aliphatic monohydric primary alcohol containing up to six carbon atoms in the molecule, at a temperature of from about 100° to about 200° C.

4. A process for the production of sulphonium sulphonates, which comprises reacting together an aromatic sulphonic acid, an aliphatic thio-ether having a low molecular aliphatic radical directly attached to the sulphur atom and an aliphatic monohydric primary alcohol containing up to six carbon atoms in the molecule at an elevated temperature of at least 50° C.

5. A process for the production of sulphonium sulphonates, which comprises reacting together an aromatic sulphonic acid, an aliphatic thio-ether having a low molecular aliphatic radical directly attached to the sulphur atom and an aliphatic monohydric primary alcohol containing up to six carbon atoms in the molecule.

6. A process for the production of sulphonium sulphonates, which comprises reacting together a sulphonic acid, an aliphatic thio-ether having an alkyl group of less than five carbon atoms directly attached to the sulphur atom and an aliphatic monohydric primary alcohol containing up to six carbon atoms in the molecule in approximately equimolecular proportions, allowing the reacted product to stratify into two layers, removing the lower layer and recovering the sulphonium sulphonate therefrom.

7. A process for the production of sulphonium sulphonates, which comprises reacting together a sulphonic acid, a hydrocarbon radical-containing aliphatic thio-ether having at least one low molecular aliphatic radical directly attached to the sulphur atom and an aliphatic monohydric primary alcohol containing up to six carbon atoms in the molecule in approximately equimolecular proportions.

8. A process for the production of sulphonium sulphonates, which comprises reacting together a sulphonic acid, an aliphatic thio-ether having a low molecular aliphatic radical directly attached to the sulphur atom and an aliphatic monohydric primary alcohol containing up to six carbon atoms in the molecule.

9. A process for the production of sulphonium sulphonates, which comprises reacting together a sulphonic acid, an aliphatic thio-ether having a low molecular aliphatic radical directly attached to the sulphur atom and an aliphatic monohydric primary alcohol containing up to six carbon atoms in the molecule, the alcohol being used in excess.

10. A process for the production of sulphonium sulphonates, which comprises reacting together a sulphonic acid, an unsymmetrical aliphatic thio-ether of more than 10 carbon atoms per molecule having an aliphatic hydrocarbon radical containing more than five carbon atoms and a lower molecular radical directly attached to the sulphur atom and an aliphatic monohydric primary alcohol containing up to six carbon atoms in the molecule.

ADRIANUS JOHANNES van PESKI.
JOHAN MARIUS HOEFFELMAN.